United States Patent [19]

Veazey

[11] Patent Number: 4,553,037

[45] Date of Patent: Nov. 12, 1985

[54] SOLAR BREEZE POWER PACKAGE AND SAUCER SHIP

[76] Inventor: Sidney E. Veazey, Box 497, Rte. 2, Fredericksburg, Va. 22405

[21] Appl. No.: 444,554

[22] Filed: Nov. 26, 1982

[51] Int. Cl.$^4$ ............................................. F03D 3/00
[52] U.S. Cl. ...................................... 290/55; 290/44
[58] Field of Search ............... 114/102, 104, 105, 39, 114/112, 283; 440/8; 416/85, 142 B, 143; 290/44, 55

[56] References Cited

U.S. PATENT DOCUMENTS

| | | | |
|---|---|---|---|
| 460,837 | 10/1891 | Addis | 416/142 B |
| 1,181,988 | 5/1916 | Brietung | 290/44 |
| 2,596,726 | 5/1952 | Rydell | 416/142 B |
| 3,371,636 | 3/1968 | Sharp | 114/102 |
| 3,974,535 | 8/1976 | Guanzini | 114/39 |
| 4,044,702 | 8/1977 | Jamieson | 114/102 |
| 4,159,427 | 6/1979 | Wiedemann | 290/55 |
| 4,276,033 | 6/1981 | Krovina | 440/8 |
| 4,371,346 | 2/1983 | Vidal | 290/55 |

OTHER PUBLICATIONS

Wind Machines: Eldridge, 2nd Ed. 1980, p. 33.

*Primary Examiner*—William M. Shoop, Jr.
*Assistant Examiner*—W. E. Duncanson, Jr.
*Attorney, Agent, or Firm*—Robert F. Beers; Luther A. Marsh

[57] ABSTRACT

A solar breeze power package having versatile sail and windmast options useful both on land and sea and especially useful in the saucer ship type design. The Vertical Axis Wind Turbine (VAWT) of the several Darrieus designs in conjunction with roll-up or permanently mounted solar cells combine in a hybrid or are used separately to provide power to a battery bank or other storage device.

37 Claims, 58 Drawing Figures

SWATH WITH CURVILINER DISTRIBUTED GENERATOR

CATAMARAN HULL

SWATH HULL

SWATH WITH WINDMILL EXTERIOR TO MAST

SWATH WITH CURVILINER DISTRIBUTED GENERATOR

SOLAR BREEZE VEHICLE

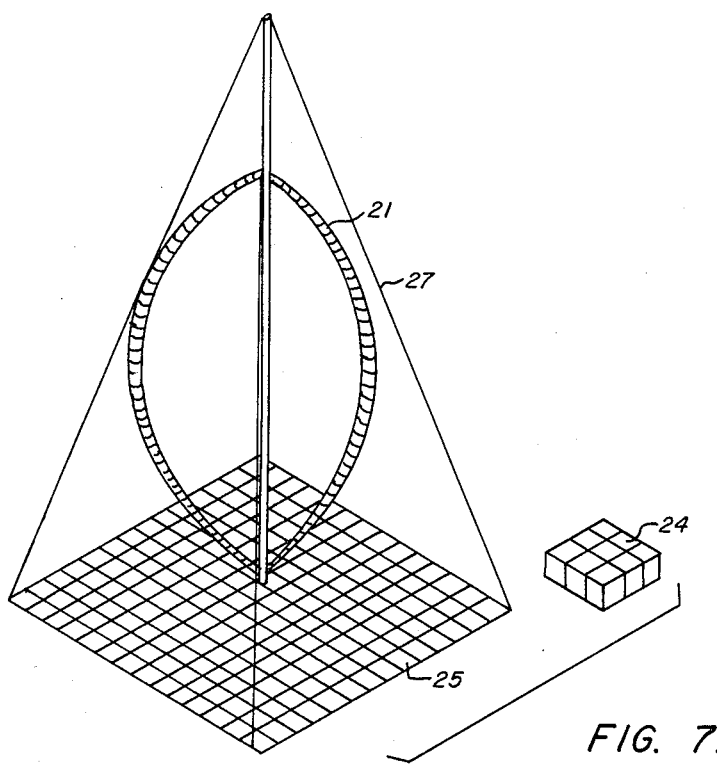
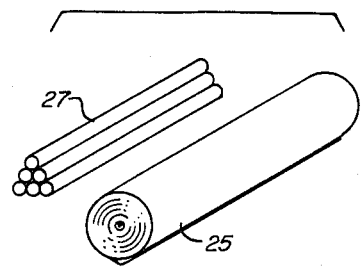
FIG. 7B
FIG. 7A
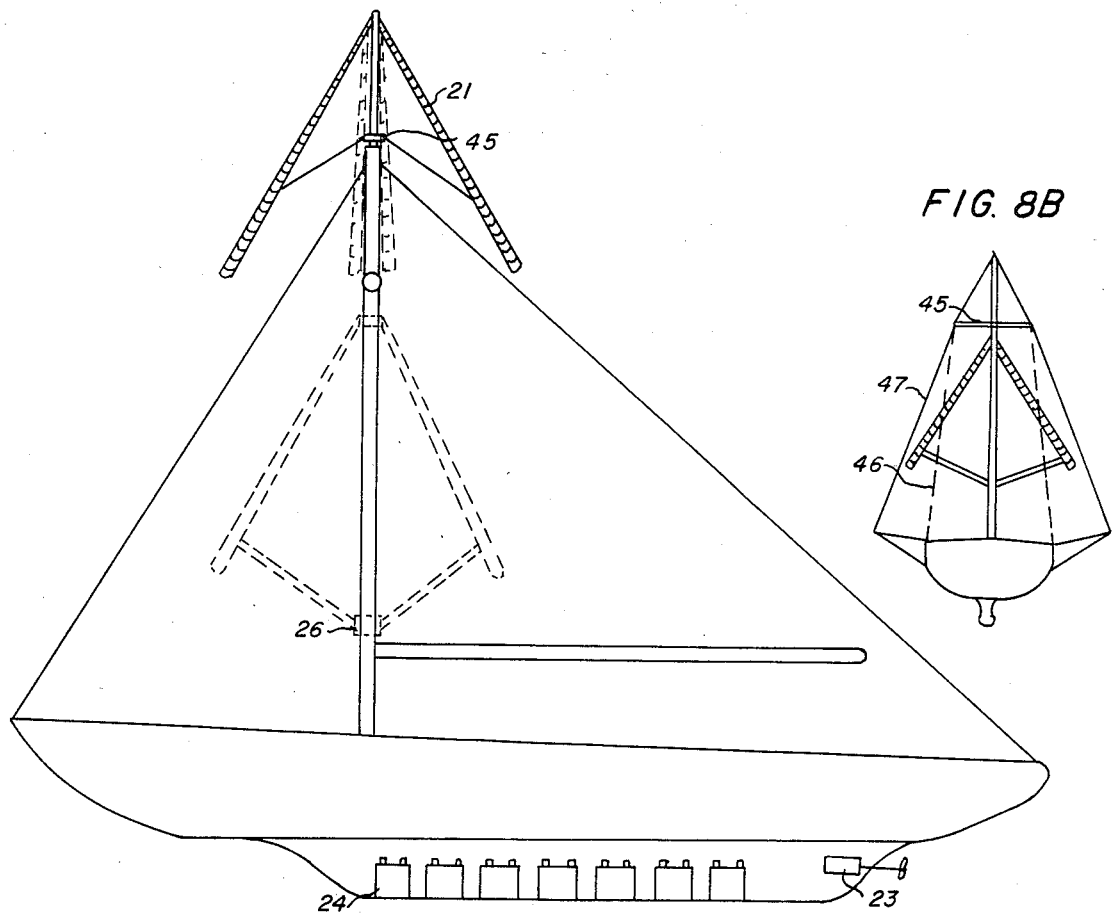
FIG. 8B
FIG. 8A    STANDARD MONOHULL SAILBOAT

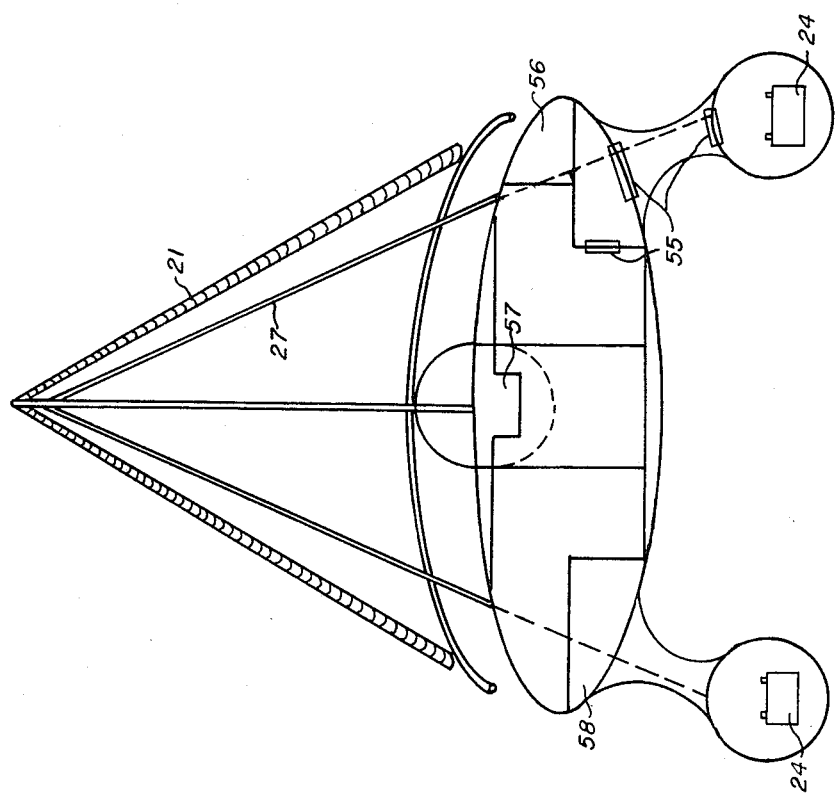
FIG. 11 "SAILING SAUCER" CROSS SECTION
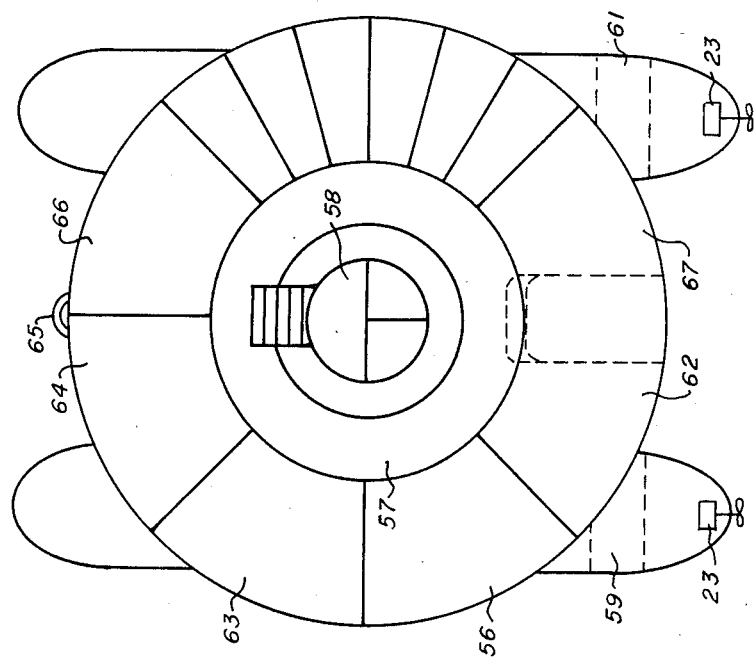
FIG. 12 "SAILING SAUCER" PLAN VIEW

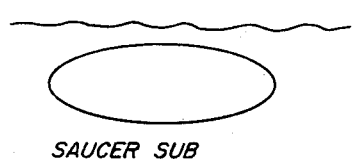
SAUCER SUB
FIG. 13A
SAUCER SURFACE SHIP
FIG. 13B
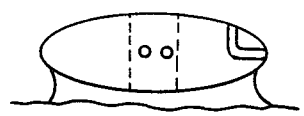
SAUCER HOVERCRAFT
FIG. 13C
SAUCER FOIL
FIG. 13D
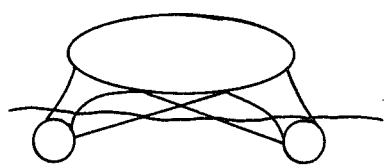
SAUCER SWATH
FIG. 13E
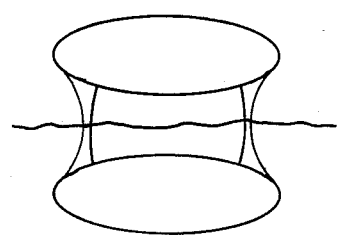
SUB-SURFACE-SWATH SAUCER
FIG. 13F
FIG. 13G
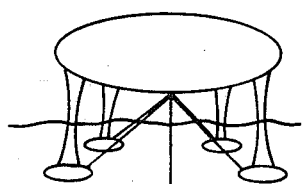
SAUCER SONAR SHIP
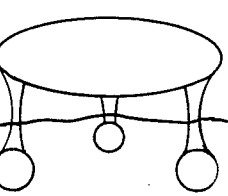
FIG. 13H
TRI SWATH SAUCER
FIG. 13J
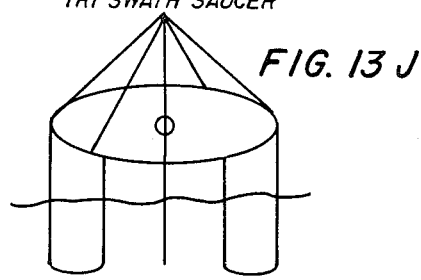
SAUCER DRILL
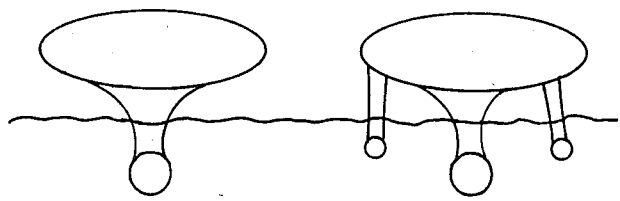
SAUCER CYLINDERS  FIG. 13I
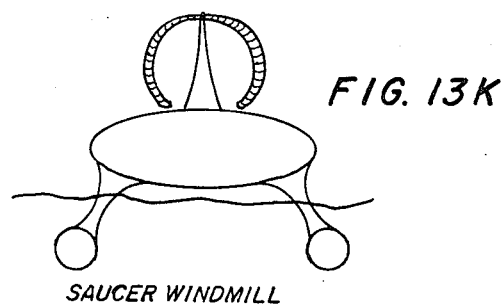
FIG. 13K
SAUCER WINDMILL
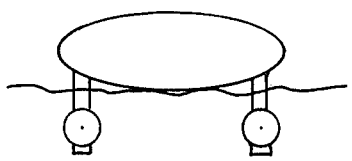
SAUCER AMPHIBIAN
FIG. 13L

SEARCH & RESCUE

ADVANCED WEAPON AIR
DEFENSE SHIP

MISSILE SHIP

SOLAR/WIND POWERED
UNMANNED RECONNISANCE/MANNED PATROL

DESTROYER

BALLISTIC MISSILE SHIP

SUB TENDER

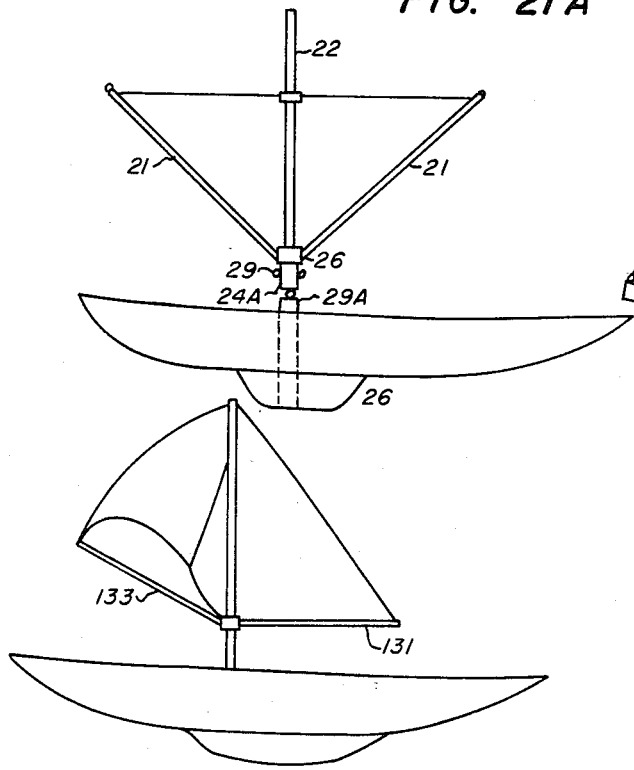
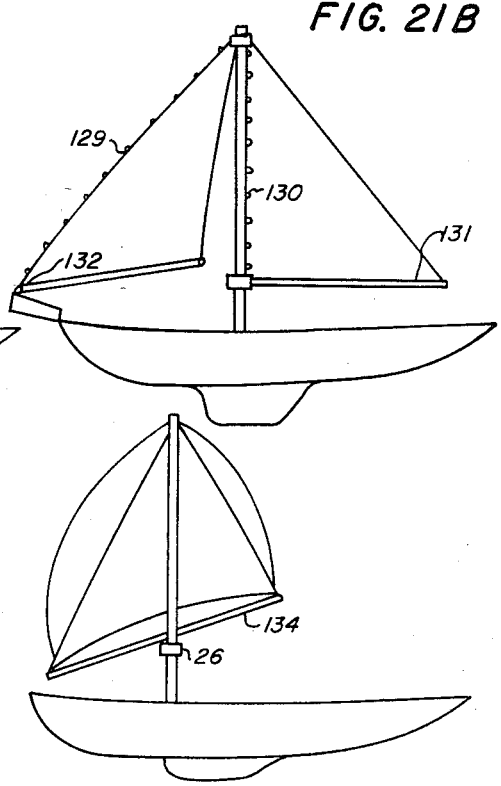
FIG. 21A  FIG. 21B  FIG. 21C  FIG. 21D
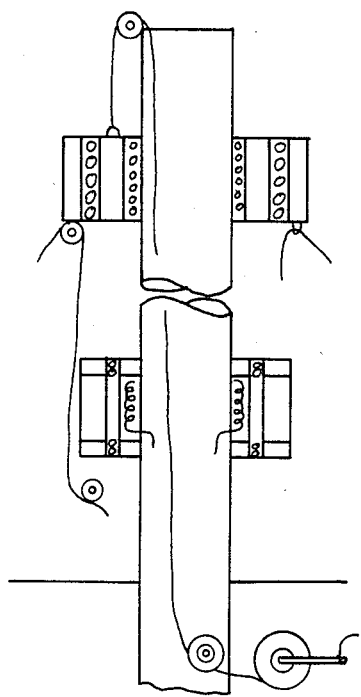
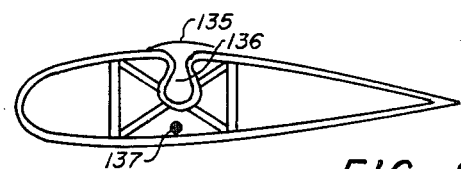
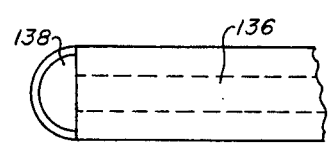
FIG. 21F
FIG. 21G
FIG. 21E

SOLAR BREEZE POWER PACKAGE AND SAUCER SHIP

BACKGROUND OF THE INVENTION

Field of the Invention

The present invention relates to an apparatus for converting natural wind energy and solar energy together or separately to an energy storage system for later use. The invention also relates to geometrical combinations and modifications to the SWATH SMALL WATER AREA TWIN HULL ship leading to improved strength, stability, and usefulness.

Small boat propulsion, troop electrical needs in the field, remote site or crippled ship emergency communications, generally require fossil fuel to provide the required power. Such power source has thermal, as well as acoustical signatures which can be dangerous in an unfriendly environment. Moreover, lack of maintenance, fuel, or spare parts can often render those complex power sources inoperable. Further, sailboats cannot store the wind energy, nor can they sail into the wind. The present invention assists in overcoming these problems.

Lastly, SWATH ships are more stable than monohulls in a seastate, but great strength is needed to support the cantilevered hulls. A SWATH based on a pyramidal structure with angled struts and foils between the twin hulls provides the needed strength through innovative design.

SUMMARY OF THE INVENTION

The present invention provides an apparatus for converting natural energy into electrical energy comprising a vertical axis wind turbine means suitably attached to a support means for providing energy to an energy storage system, a solar cell means suitably attached to said support means for further assisting in providing energy to said energy storage system, and an energy storage system affixed to said support means and interfaced with said solar cell means sufficient to accept energy therefrom ans store for later use. Innovative modifications to the SWATH yield geometries amendable to more efficient use of wind and solar energy.

OBJECTS OF THE INVENTION

A primary object of this invention is to provide an easily portable and erectable or permanent combination vertical axis wind turbine means singly or in conjunction with roll-up or permanently mounted solar cell means for providing a conversion of natural energy into electrical energy and storing the electrical energy in an energy storge system for later use.

Another object of this invention is to provide such an apparatus for easy use on land, in the air (as from a tethered blimp), and at sea where there are modest, quiet, reliable electrical power needs.

Another object of this invention is to provide an apparatus for using a combination of solar and wind sources for extending power generation from natural energy.

Still other objects of this invention provide, in various types of a sea vehicle or land platform environment, an apparatus for extending power generation from natural energy utilizing: (a) a solar cell "mat" which is easily portable and unrolls; (b) a tetrapod mast that doubles for use as a crane if and when required; (c) a portable windmill tetrapod mast vehicle for use on land, in the air, and at sea; (d) a combination windmill, solar, and sail power in a saucer-shaped vehicle; (e) a windmill without a central shaft; (f) a sail vehicle in configuration with this invention utilizing a versatile sail arrangement; (g) a collapsible and self-governing Darrieus windmill arrangement; (h) a dingy of ellipsoidal section conformed to a saucer-type vehicle hull; (i) a curvilinear generator doubling as railing on a saucer-type vehicle hull; (j) a windmill utilizing a curvilinear generator; (k) a foldable Darrieus windmill along the mast; (l) lead acid batteries for energy storage rather than inert lead in a sailboat keel; (m) an improved SWATH vessel utilizing a pyramidal structure and angled struts; (n) a SWATH vessel utilizing an ellipsoidal upper hull; and (o) a "V" Darrieus windmill whose blades can be used as various spars for sailing and as booms of cranes.

BRIEF DESCRIPTION OF THE DRAWINGS

FIG. 7A, FIG. 7B and FIG. 7C illustrate the combination portable solar pads and Darrieus windmill used to charge batteries on land.

FIG. 8A, FIG. 8B show a monohull sailboat, but any boat or ship having a mast works the same retrofitted with a collapsible "Δ" Darrieus windmill that is folded along the mast (or a stay) like an umbrella mechanism when not in use.

FIG. 11 shows a cross-section of the saucer-type sea vehicle useful in its strength, space utilization, safety, and geometry in the invention.

FIG. 12 shows a plan view of the saucer-type sea vehicle utilizing the invention useful in its general arrangement.

FIG. 13A, 13B, 13C, 13D, 13E, 13F, 13G, 13H, 13I, 13J, 13K, 13L, and 13M illustrate various possible variations of the modified saucer-type ship design useful in the invention.

FIGS. 21A, 21B, 21C, 21D, 21E, 21F, and 21G illustrate various designs utilizing a Darrieus windmill wherein the blades are used for sailing when not utilized as a windmill.

DESCRIPTION OF THE PREFERRED EMBODIMENT

Figure 1:
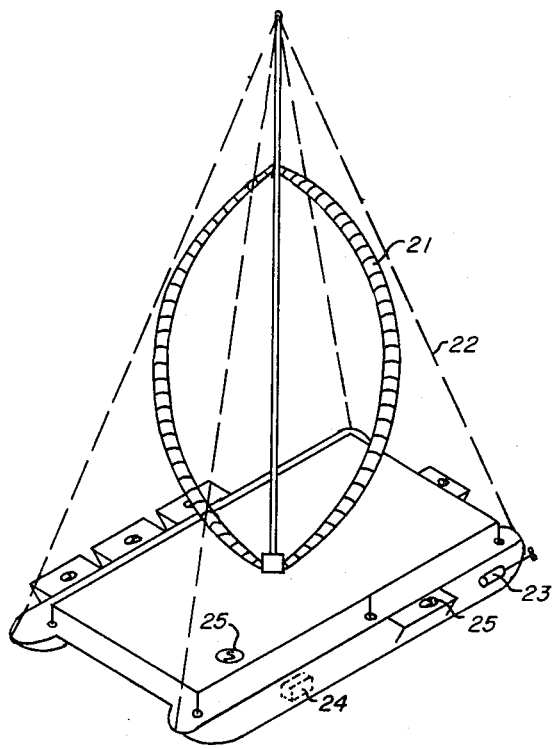
FIG. 1 shows a catamaran with a supported or unsupported mast and the "Φ" Darrieus windmill of the invention. Flexible blades can be detached from the generator and stretched parallel to a stay or tetrapod to remain clear of other operations.

FIG. 1 illustrates a catamaran hull with a standard supported mast with stay 22 or unsupported mast and the egg beater or "Φ" Darrieus windmill 21 utilized as a vertical axis wind turbine (VAWT) means for converting natural energy into electrical energy through generator 26 and for storage in batteries 24. Solar cells 25 are positioned on the deck and are used singly or together as a combined hybrid for converting natural energy into electrical energy and its consequent storage until needed. Solar cells are also shown hinged to the gunwale of the craft whereby they can be arranged vertically when entering or leaving port to prevent damage, or at the best angle for the sun otherwise.

Figure 2:
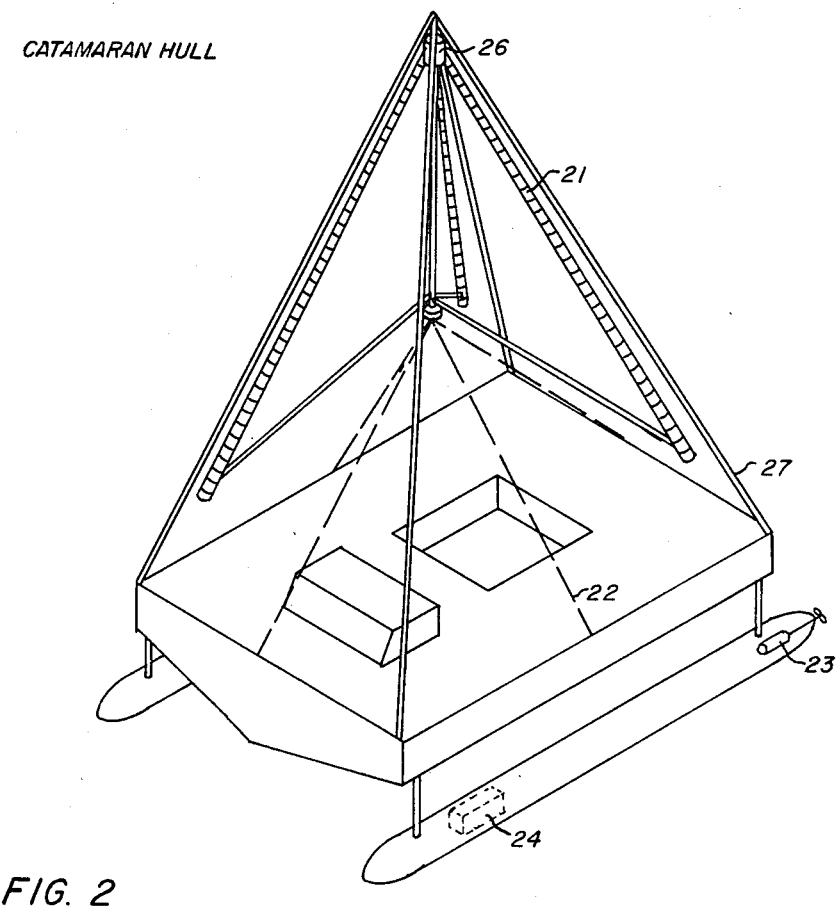
FIG. 2 illustrates a SWATH type hull with a working mill where a vertical mast would interfere.

FIG. 2 shows a SWATH type hull with a working well where a vertical located mast can interfere. Where no interference on deck 105 exists, the vertical shaft can extend to deck 105 with generator 26 placed there instead of atop the mast. Further, with windmill 21 lowered and stowed, tetrapod mast 27 can be used as a crane.

Figure 3:
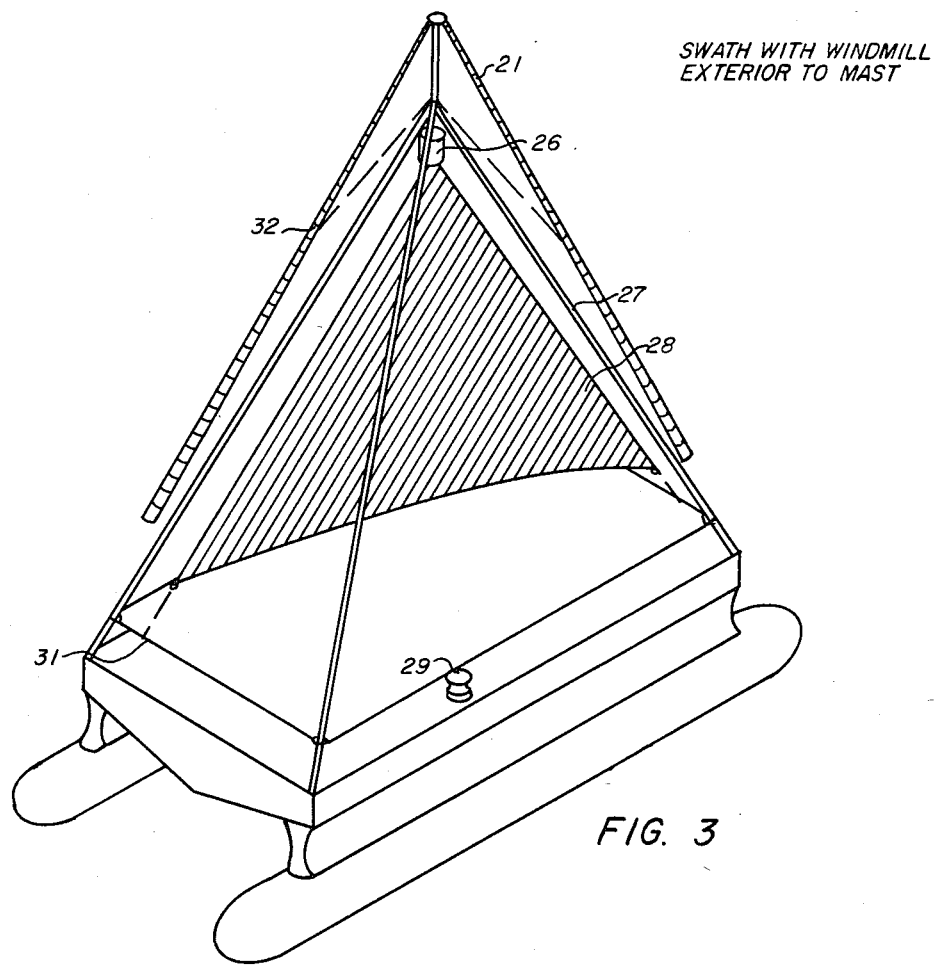
FIG. 3 shows the "Δ" Darrieus windmill located exterior to the tetrapod mast to avoid interference with a sail. This versatile sail can be trimmed through 360°.

FIG. 3 shows windmill 21 located exterior to tetrapod mast 27. This allows versatile sail 28 can be easily trimmed through 360° by one continuous sheet driven by clockwise/counterwise winch 29 electrically or manually operated. The variable distance along the foot of sail 28 is taken into account by a spring, elastic, or block and tackle attachment to sheet 31. Centrifugal force can naturally raise windmill 21 blades and thus self-govern them to prevent overspeed in high winds.

Figure 3A:
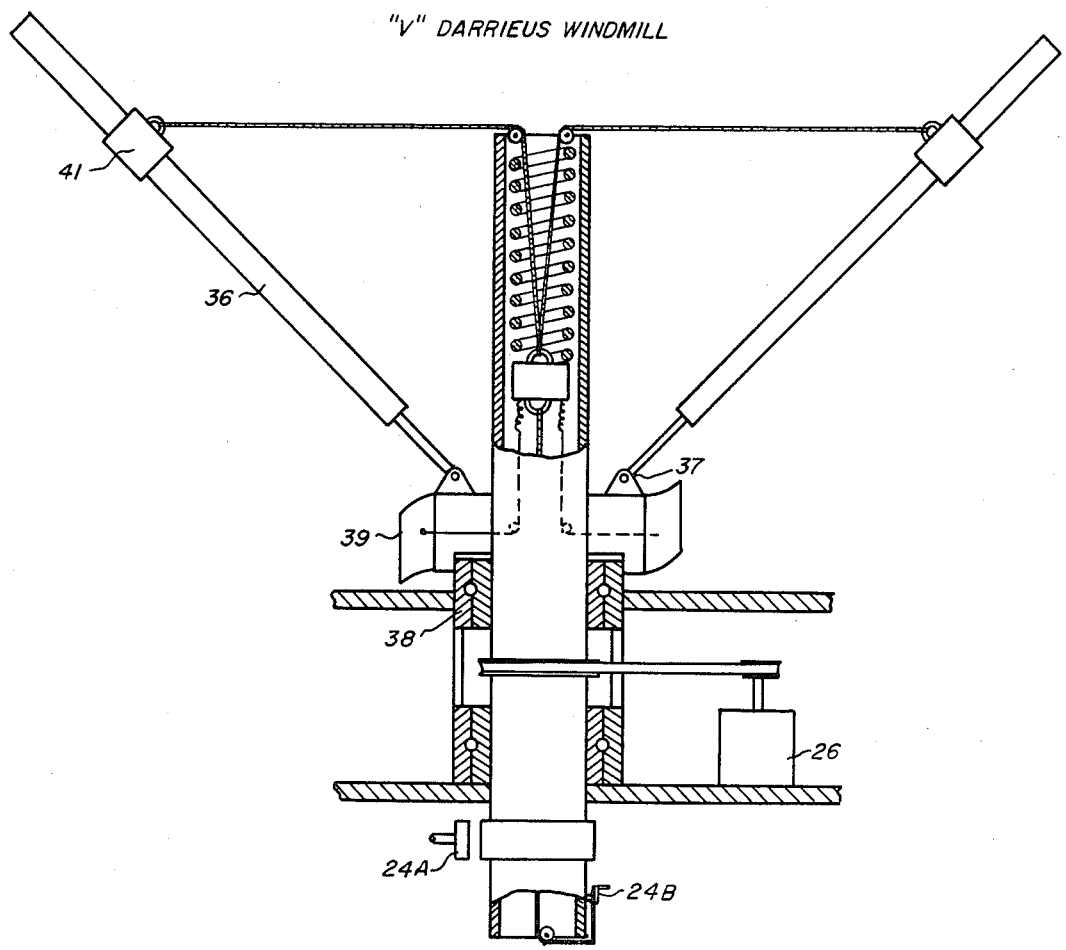
FIG. 3A illustrates a new "V" Darrieus windmill blade design having simple regulation and control.
Figure 3B:
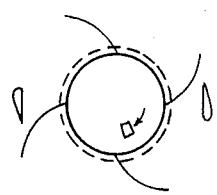
FIG. 3B illustrates an individual view of savonis buckets 39 of FIG. 3A.

FIG. 3A illustrates a "V" Darrieus blade design 36 with simple regulation by mechanism 37. Fold mechanism 41 allows "V" Darrieus blade design 36 to fold against the mast. Brake system 24 is shown and is used as required. The "V" Darrieus windmill 36 provides and converts natural energy to generator 26. A Savonis windmill whose buckets 39 provide startup, then fold around circumference of base. FIG. 3B illustrates Savoninus buckets 39.

Figure 4:
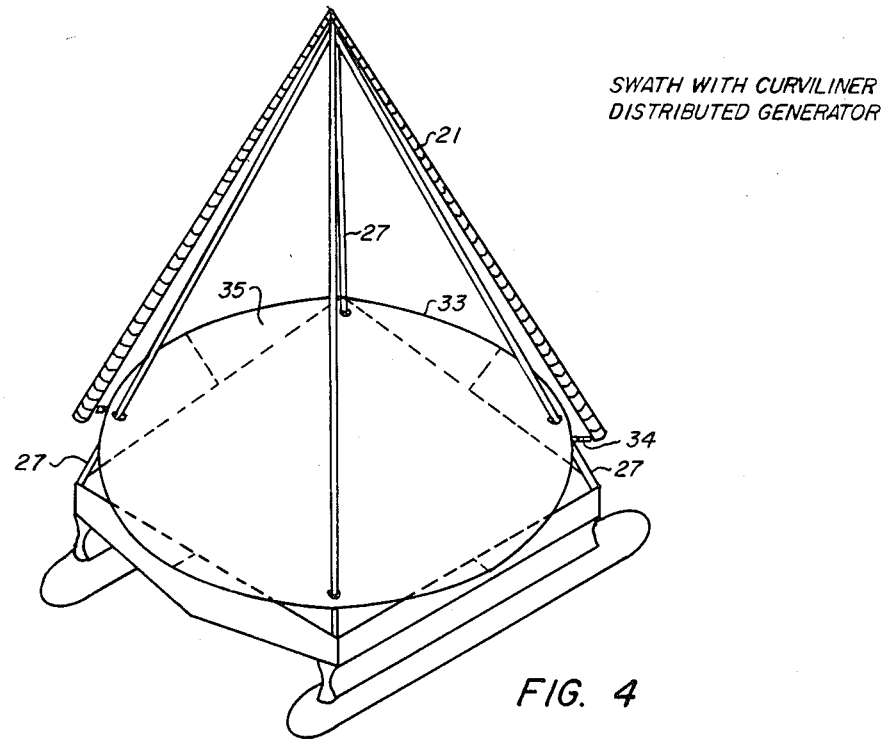
FIG. 4 illustrates an exterior Darrieus windmill interfaced with a curvilinear generator located at the bottom of the windmill blade.

FIG. 4 shows a "Δ" Darrieus windmill 21 located exterior to tetrapod mast 27. The "Δ" Darrieus windmill 21 blade uses a ring-shaped linear induction generator 33 where permanent magnet "slug" 34 driven by the blades induces electrical voltage in coils within the large diameter generator. This distributed generator needs no step up gearing to get the required frequency for AC generation. Furthermore, round stator/railing 33 is amendable for using versatile sail 28 arrangement, as the distance between the tack and clew of sail 28 is constant. This arragement leads to the saucer-shaped platform utility through the geometry.

One prime feature of tetrapod mast 27 is its ease of collapsibility. It can easily be collapsed to go under a bridge, for maintenance or other operational requirement, such as, for landing a helicopter on a patrol vessel.

Figure 5:
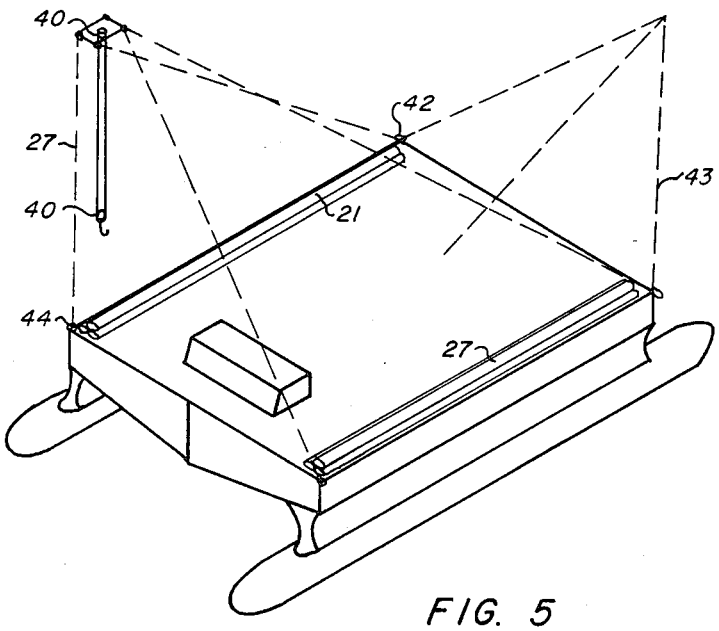
FIG. 5 shows how the pods are slipped through the deck and apex connections to lower the apex for ease of detachment and storage and to permit a range of motion over the entire deck and adjacent outboard areas.

FIG. 5 illustrates how pods 27 can be slipped through deck connections and apex connections 44 and 42 to lower the apex. Any two pods 27 can be used as a movable crane 43 over the side. With pods 27 mechanically able to forceably move through connections 42, 44 on the ship and at the apex, where they are connected 90° clockwise or counterwise to the point of hull attachment (similar to poles in a teepee), tetrapod mast 27 then acts as crane 43, able to be moved above any point on the ship or the adjacent waters of the ship within the limites of extension. Such connections can be mechanically, electrically, or hydraulically powered.

Figure 6:
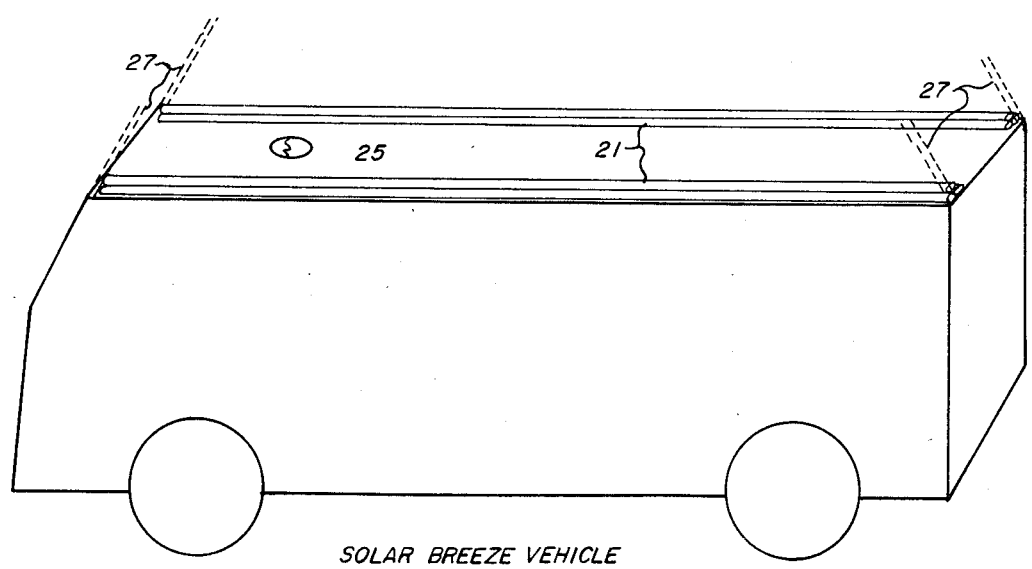
FIG. 6 shows utilization of the solar cells on the roof of a land vehicle and the tetrapod mast stowed or erected as in FIG. 7 with windmill to allow the wind and sun to assist in charging the batteries or other energy storage device.

FIG. 6 illustrates solar cells 25 can be used on roof with tetrapod mast 27 either erected or stowed, thus allowing the wind and sun to assist in charging the batteries of a land vehicle. This arrangement yields good versatility in remote areas to great advantage.

FIG. 7A illustrates the combination solar cell mats 25 and Darrieus windmill 21 to charge batteries 24 ashore. The solar cell in this arrangement is so designed to be flexible and durable enough to be rolled up like a rug. This utility yields a simple and portable power source for communications without the need for fuel and without an audible or thermal signature. FIG. 7B illustrates the solar cell folded up; FIG. 7C illustrates the solar cell rolled up like a rug.

FIG. 8 shows a monohull sailboat, but is equally applicable to any boat or ship with a mast, can be retrofitted with a collapsible Darrieus windmill 21 which is folded along side the mast when not in use. Such folding operates similar to an umbrella. This design arrangement allows for self-governing as centrifugal force raised windmill 21 blades higher, thereby reducing the area of intercepted wind and hence the generated power, as increasing wind speed tends to overspeed windmill 21. In the closed position, windmill 21 shaft can partially retract into the vertical mast. Generator 26 can be located below deck 105 or atop the mast. The example shown in the dotted lines shows a retrofit with generator 26 located just above the boom and below the track for the mainsail. The motor in this example is of the revolving stator variety with the fixed rotor inside the mast and in a permanent magnet rotor. In this teaching, if a larger "Φ" Darrieus 21 (not shown) or "Δ" Darrieus would not fit within shrouds 46, they can be extended as shown in 47. The straight blade Darrieus 21 is folded along the mast's port or starboard sides when the struts are unpinned, which struts also folded alongside the mast or stored elsewhere.

The SWATH (Small Water Area Twin Hull) design combined with the saucer shaped hull (SWATH/SAUCER) leads to possibly the best hull design for a tetrapod mast 27 and the VAWT (Vertical Axis Wind Turbine). The SWATH design is fast, stable in high seas, a good bistatic and passive sonar platform, and very maneuverable. The saucer ship design is strong, has less deck wetness problem, is streamlined, and the continuous changing curvature offers a small visual and radar cross-section. Moreover, the circular geometry is amendable to the VAWT, phased array radar, particle beam accelerators, missile torpedo, and mine arrangements, and in general, sensors and weapon location arrangements to meet unexpected threats from any of the 360° of the compass, as well as from above or below.

Figure 9:
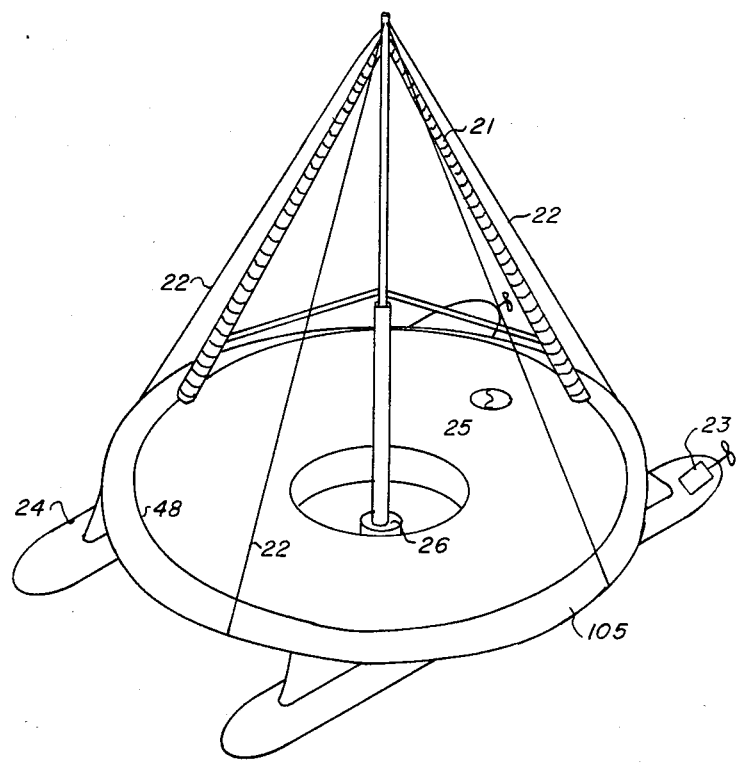
FIG. 9 illustrates utilizing the vertical axis wind turbine for a purely electrically powered SWATH design boat, whose ellipsoidal upper hull geometry is more amenable to a vertical axis wind turbine.

FIG. 9 illustrates an electrically powered boat, nicknamed "Windboat" from the combination windmill and sailboat that accommodates a VAWT system quiet well. The conventional mast has four equally placed stays 22. The large surface area is conducive to an array of solar cells 25 imbedded in deck 105. The electricity produced is used directly to drive the electric propulsion motor 25, or is stored in batteries 24 for later use.

Figure 10:
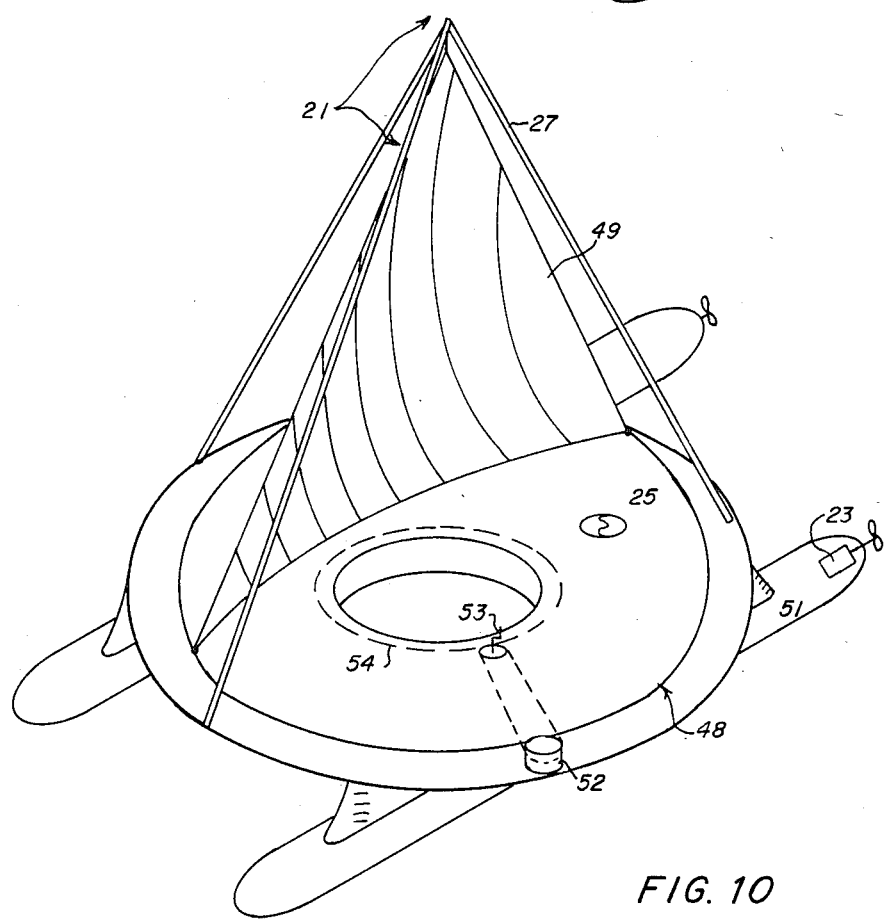
FIG. 10 illustrates the circular geometry of the saucer-type sea vehicle and its amenability to the versatile or "windbeater" sail in the invention. This sail is controlled by a winch and can be trimmed through 360°.

FIG. 10 illustrates the circular geometry of the saucer design and is very amendable to the versatile or "windbeater" sail 49. Tetrapod mast 27 leaves the control area free, negating pulling the jib around the mast upon tacking. The versatile sail 28 is a combination jib, mainsail, and spinnaker, and greatly simplifies sailing procedures. It can permit sailing closer to the wind, and permit one man to make repeated short tacks in restricted waters. The saucer design here can be configured, as in FIG. 3, with windmill 21 outside tetrapod mast 27 and solar cells 25 as well. This example has been nicknamed the "Solar Breeze".

FIG. 11 shows a cross-section of one arrangement of the saucer design boat. The cockpit 57 is central with a hemispherical clear bubble which retracts under cockpit 27 in good weather. Visibility, often poor from the cockpit of a monohull sailboat, is excellent. Water from any direction sheds equally well off deck 105. The large amount of inertia from the weight of batteries, fuel, and water tanks in the cylindrical underwater hulls assist the inherent stability of the SWATH design. Aerodynamically, the hull above the water is clear and reacts approximately the same to winds from any direction. The continuously curved surfaces are pleasing to the eye and the shape gives the maximum interior useable room for the surface area. Full standup headroom and a circular walkway for ease of access to all areas of the boat are located around the center of the boat.

FIG. 12 shows a plan view of the saucer design of FIG. 11. This design utilizes space very efficiently. Berths, for example, utilize space efficiently as a wider space is provided for shoulders than for the feet. To get to any destination, one can walk either clockwise or counter-clockwise. All areas of lower headroom are accessible from the full height of the circular walkway. One section of the closest has access from cockpit 57 for storage of long items, such as boat hooks, fishing poles, crab nets, and antennas. A dingy is stowed in a recess in the hull designed to accommodate it. Access to the dingy, which can be lowered from winches to the water, can be from topside or from within the saucer by opening doors above the dingy access.

FIG. 13 shows several variations of the saucer ship design, illustrating a number of configurations and utilizations of the saucer design. In the past, weapons and weapon systems were designed to operate from the types of ships that had developed through the ages; basically these were cylindrically shaped monohulls because that shape is fast, due to the length to beam ratio. This invention considers returning to the basic geometries of the problem for a warship, given the characteristics of modern weapons. The direction of incoming threats or targets, in general, are completely unknown. Thus, weapons and sensors should be equally effective around all 360°. A threat or target can come from above, below, or along the air/water interface. A vector plotted regarding all the expected threat and target probabilities would probably describe a surface which would be an ellipsoid, given the limited depth of submarines, torpedos, and mines, the limited altitude of aircraft and missiles, and the effective range of surface ship weapons. Thus, an ellipsoid or saucer shape is considered useful for a warship, both submerged or surfaced.

The SWATH design allows for the interface instabilities by decoupling itself from the wave action. Thus, in combining the saucer shape with the SWATH, one gets the speed of the cylindrical underwater shapes, the minimum interaction of the air/water interface, and the omnidirectional and strength characteristics of the saucer.

Figure 14A:
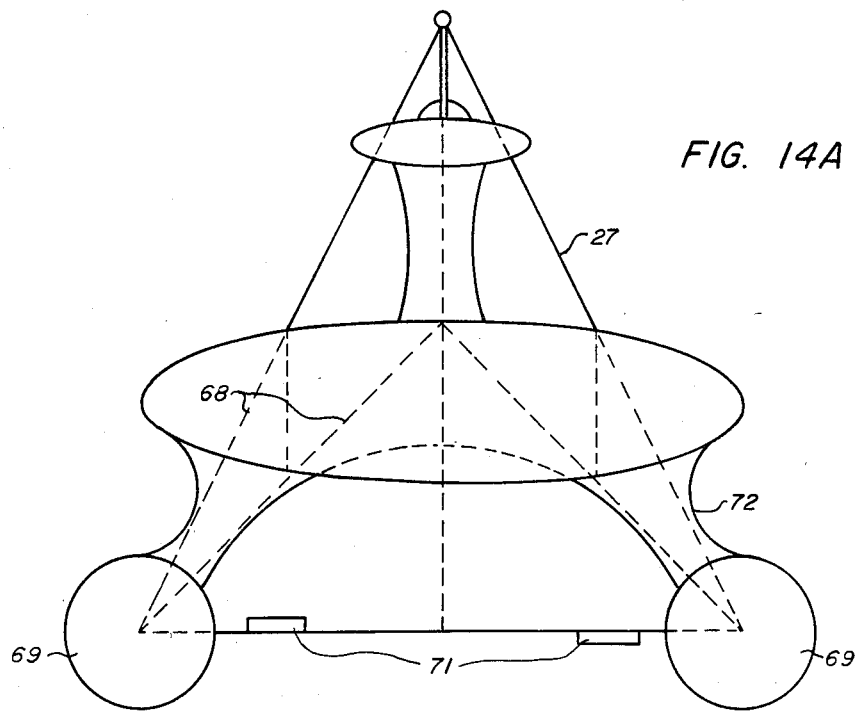
FIGS. 14A and 14B illustrate a saucer-SWATH combination sea vehicle design useful in the invention.
Figure 14B:
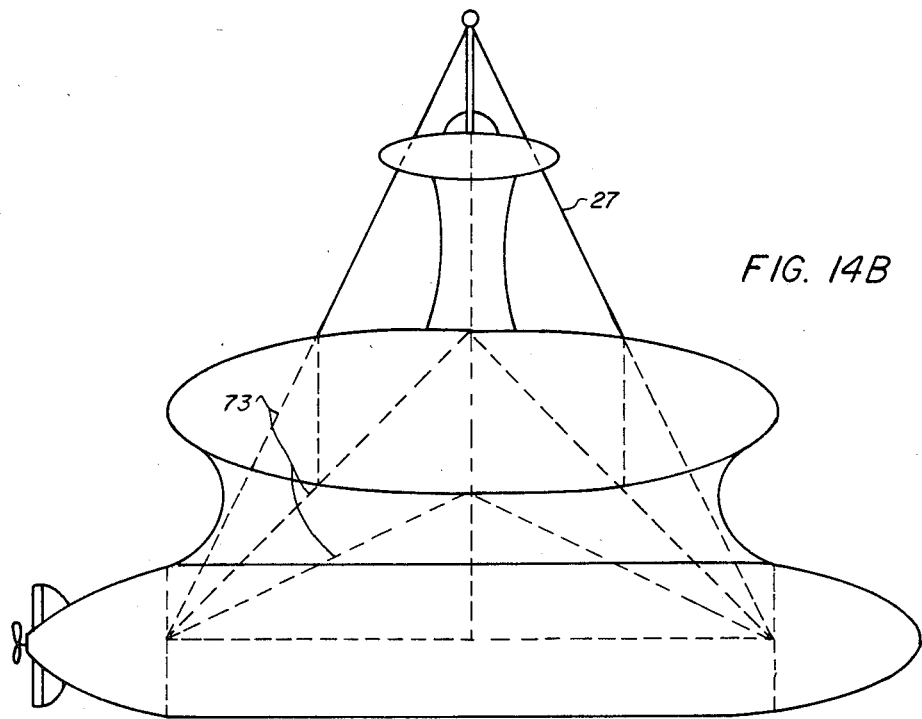

FIG. 14 illustrates the saucer-SWATH combination design. Such design decouples the platform from the surface wave action to a significant extent and allows relatively high speed in a high sea state. This design allows the two cylindrical hulls to operate completely submerged, and the upper hull to be completely airborne, supported by angled struts which connect the two shapes. The small water plan area of the struts allows minimum transfer of wave energy to the platform. Such design is compatible with a phased array radar arranged around the periphery of the vessel. Cylindrical missile/torpedo/mine vertical launch tubes of decreasing length as one proceeds radially outward from the ellipsoid's center naturally form the stiffening bulkheads for the ellipsoid or saucer shape. Deck wetness is no longer a problem and water washdown under CBR warfare is enhanced by the shape. Moreover, the continuously curved surfaces offer a small radar cross-section. Further, other sensor, weapons, and communications have spherical spreading characteristics which allow better design of such systems into a saucer shaped hull. And lastly, because the wave drag is reduced and most of the drag is skin friction, the use of compliant surfaces, electrolytic drag reduction, heated boundary layers, and use of polymers can assist speed even further. FIG. 14 further illustrates a unique system of triangles forming a pyramidal structure and a tetrapod mast 27 as a means of avoiding heretofore strength problems associated with the linkage between the separate hulls. The strength and unity of this design are illustrated as shown by the straight lines (structure) in FIG. 14. Further, the curved surfaces offer more strength than do flat surfaces. The curved surfaces, because they follow the simple mathematics of the ellipsoid and cylinder, are amendable to numerical machine fabrication, automatic welding, or composite construction. The structural beams can be made of pipe, thus allowing power and data lines to be protected in these pipes.

Figure 15A:
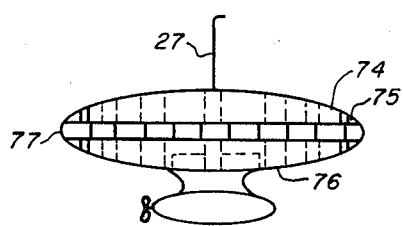
FIGS. 15A, 15B, and FIG. 15C illustrate saucer hull applications of ellipsoidal/cylindrical submarine shapes useful in the invention.
Figure 15B:
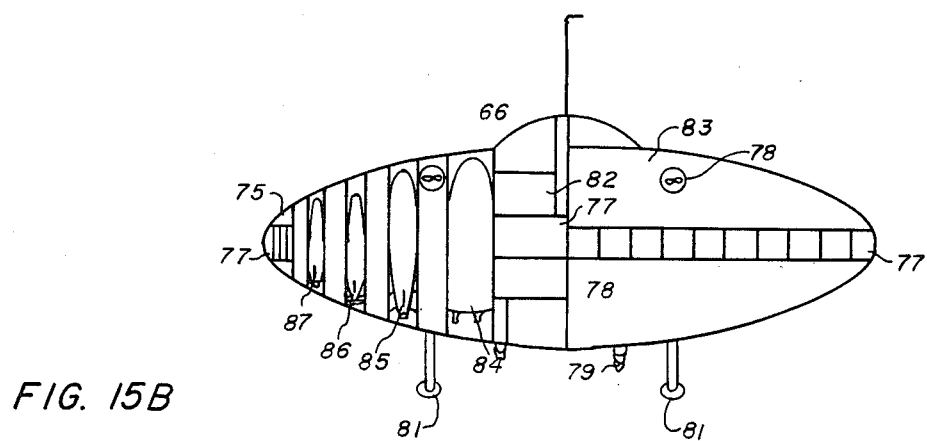
Figure 15C:
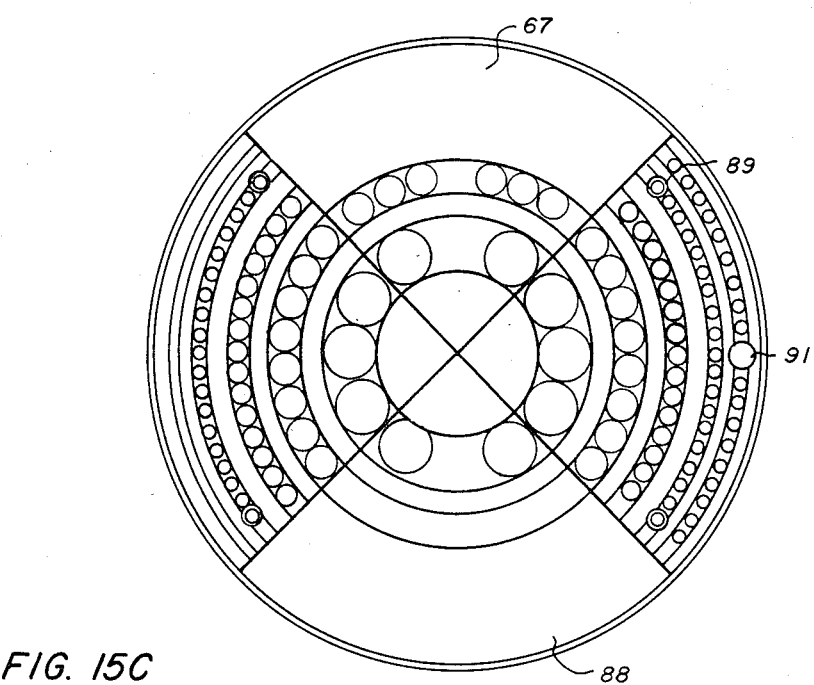
Figure 16A:
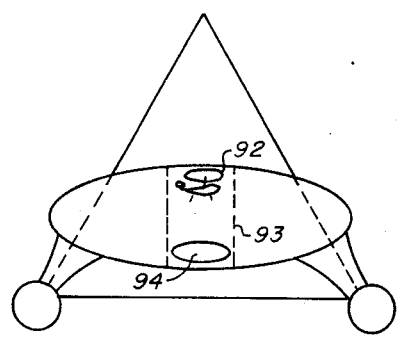
FIGS. 16A, 16B, 16C, 16D, 16E, 16F, and 16G illustrate other versions of the SWATH-saucer design useful in the invention.
Figure 16B:
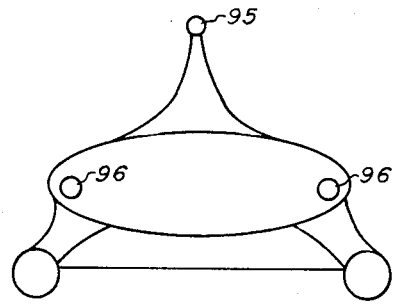
Figure 16C:
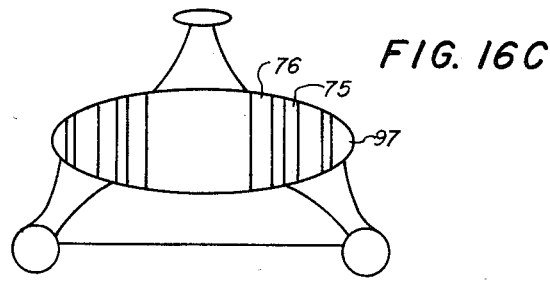
Figure 16D:
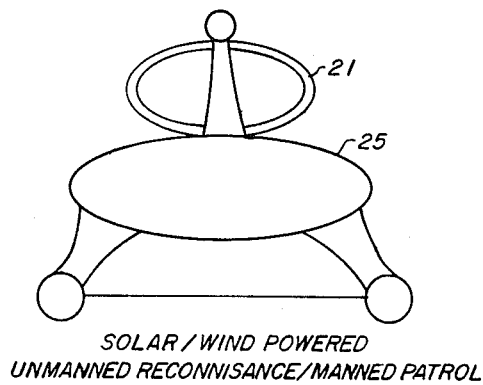
Figure 16E:
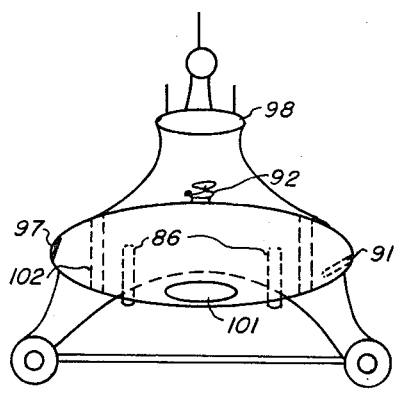
Figure 16F:
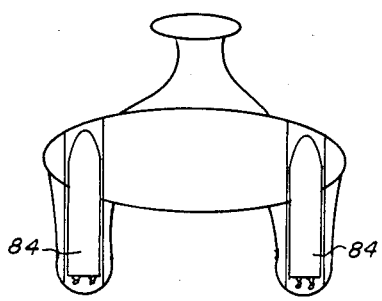
Figure 16G:
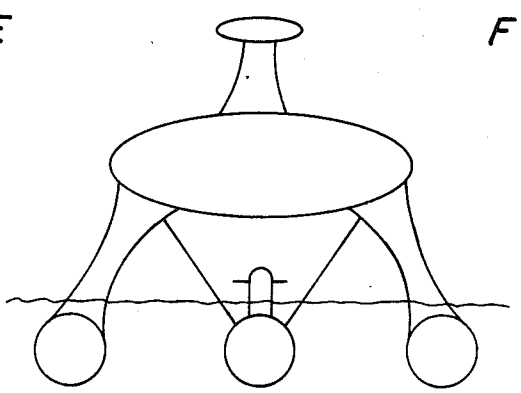

FIGS. 15A, 15B, and 15C illustrate ellipsoidal/cylindrical submarine shapes utilizing the ellipsoid and its modifications representing saucer-type hull applications. A passive sonar array 77 can be utilized around the circumference with no blind spots, decoys/signals 75 just inboard, and longer vertically launched torpedo/mines 74 and cruise missiles 76 located more inwardly. The separating partitions further provide the stiffness and strength needed vertically. FIG. 15B can be utilized as a container shape, modified to accommodate the MX missile, and operate in protected continental shelf waters on the ocean floor with random quiet relocations as desired. Also, 15C shows an ellipsoid sail on a conventional submarine hull permitting 360° sonar coverage.

FIG. 16 illustrates a number of possible useful versions of the SWATH/SAUCER design. The search and rescue design illustrates a central cylindrical elevator 93 to handle helicopter 92, a circular ACV, and a diving saucer to search from the air, the surface, and underwater for missing airmen, sailors, or submarines. The bridge is supported by tetrapod mast 27 and provides good visibility, yet provides helicopter operations. This example permits operations in bad weather when most search and rescue operations are needed.

The Advanced Weapons Air Defense Ship provides a platform of circular design useful in new weapons technology. A directed tracker 95 and ring laser or cyclotron particle beam accelerator 96 is built in and operated as illustrated.

The missile ship utilizes the varying thicknesses of the ellipsoidal hull for the various length weapons, the cruise missile/torpedo mines 76, A/S, A/A, decoys 75, are carried in the vertical launch tubes. No complicated gas management system is required for rocket exhaust in this example as the saucer shaped hull is above water. Further, phased array radar 97 is a natural around the hull's circumference.

The solar/wind powered platform uses the circular geometry to good advantage by virtue of the large surface area for solar cells 25 and the rotating windmill 21. Such platform can be used for long-term moored or mobile, manned or unmanned surveillance duties. Such utilization is possible due to the renewable energy powered design.

The destroyer design uses most of the technology discussed above and includes sonar as the cylindrical hulls offer good bistatic ranging due to their physical separation. Machinery in the hull toward the target can be shut down to provide better listening from passive arrays. The foils between the twin hulls also have sonar arrays permitting listening forward and aft.

The ballistic missile ship provides for a ballistic missile alternative in a fairly small ship with or without the VAWT and sonar cells as described above. The height required for the missiles is provided in the fattened struts. Such ship can operate in inland as well as coastal waters. Further, it can be disguised easily as an offshore drilling platform, a windmill platform, or OTEC platform as illustrated in FIGS. 18 and 19 for cover.

Figure 17A:
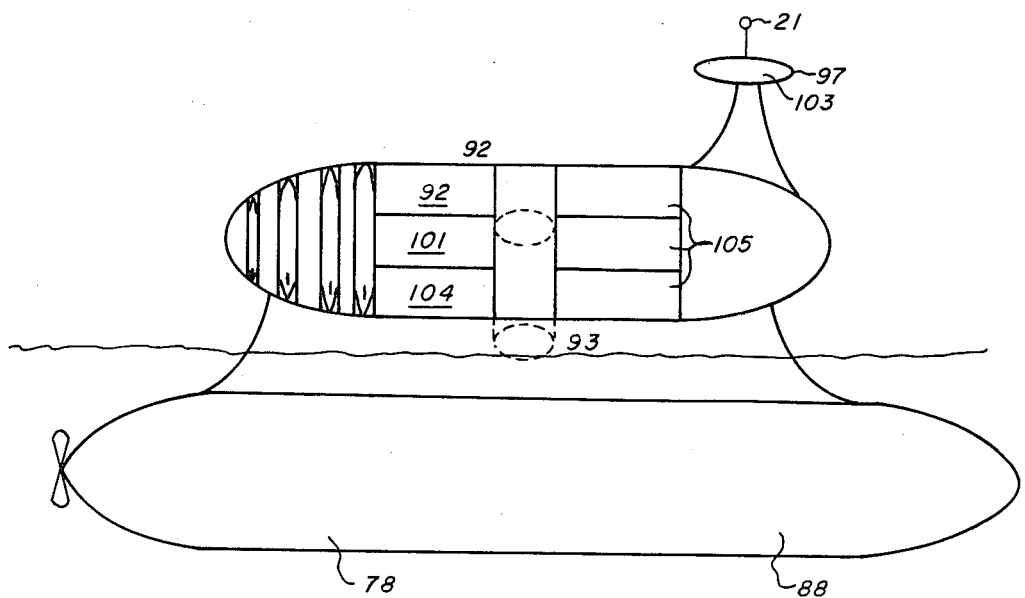
FIGS. 17A and 17B illustrate the SWATH saucer seacraft/aircraft/amphibious assault ship designs with circular geometry useful in the invention.
Figure 17B:
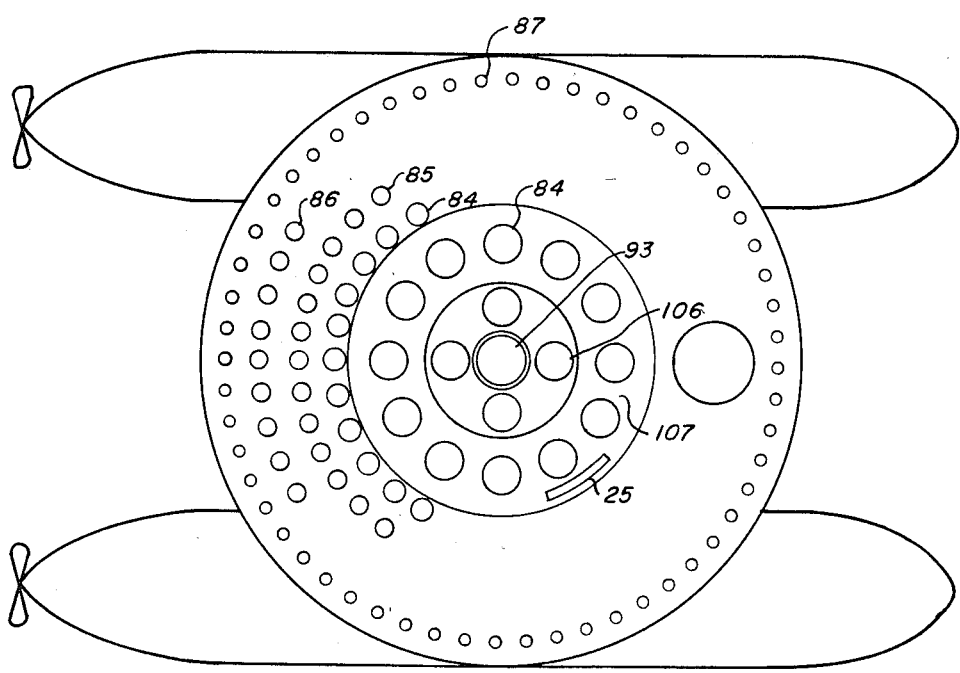

FIGS. 17A and 17B illustrate a seacraft/aircraft/amphibious assault ship. Its details include a centrol elevator 93, which takes aircraft to the decks or lower seacraft to the water between the hulls various missile vertical launch tubes standby craft 106, and repair/readying station 107.

Figure 18A:
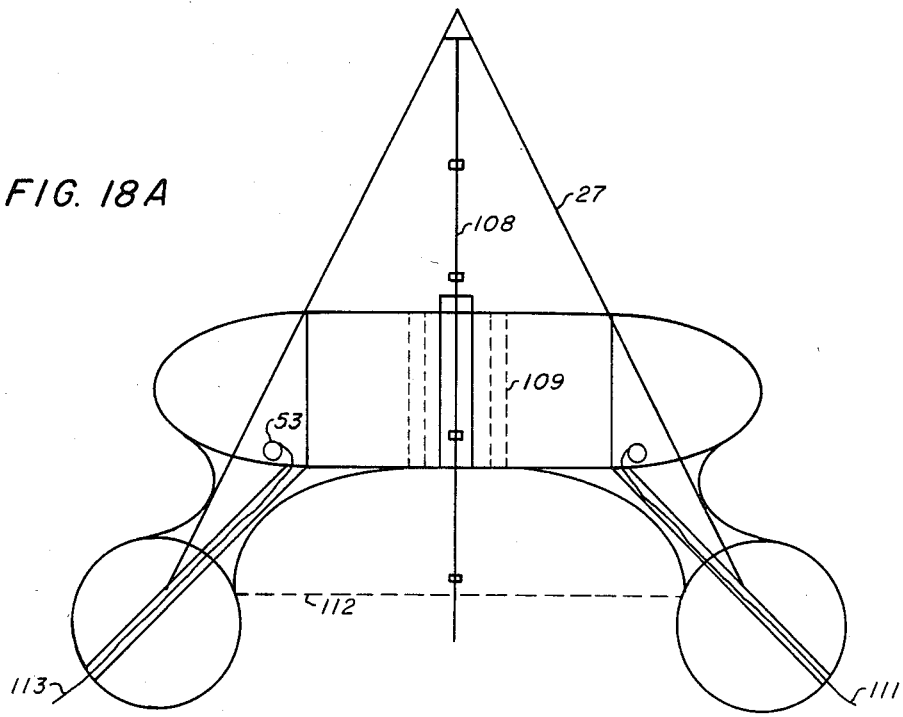
FIG. 18A illustrates a utilized SWATH saucer design for a movable offshore oil drilling oil rig or ocean bottom exploration ship useful in the invention.
Figure 18B:
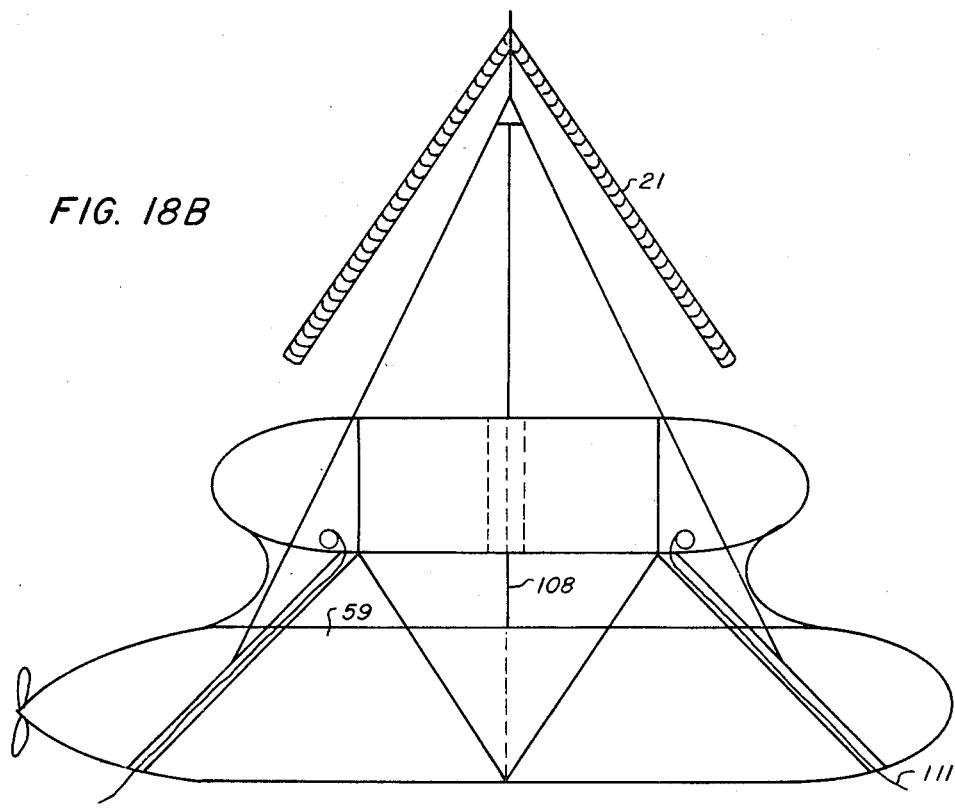
FIG. 18B illustrates utilizing an optional windmill drilling/power generation.

FIG. 18 provides a unitized pyramid/SWATH/Saucer design for an oil rig, deep ocean recovery or ocean bottom exploration ship. The pyramid frame is ideally suited for having the 4 point moor anchor lines run out the pipe forming the pyramid structure at the 4 corners down to the anchors at the ocean bottom. The extension of the pyramid frame above the saucer deck becomes the tetrapod mast 27 which is a natural support for the drill rig. The cylindrical pipe through which drill 108 penetrates the hull is an excellent stiffener for the ellipsoidal hull. Extra drill pipe is stowed circumferentially around the drill area in the hull. Other drill pipe is supplied, as needed, by barge coming under the platform by deballasting the platform sufficient to allow the barge to clear. The tetrapod mast 27 can be utilized to support windmill 21 to generate electrical power for supplementing conventional power for drilling and necessary services.

Figure 19A:
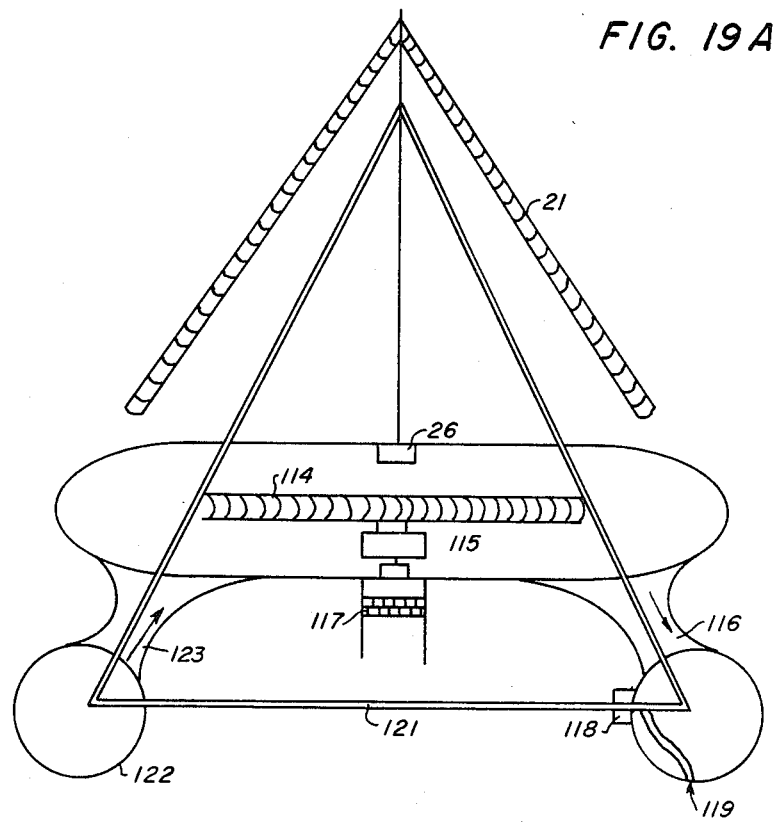
FIGS. 19A and 19B illustrate a movable ocean thermal energy conversion (OTEC) platform useful in the invention, with optional wind and wave energy conversion devices.
Figure 19B:
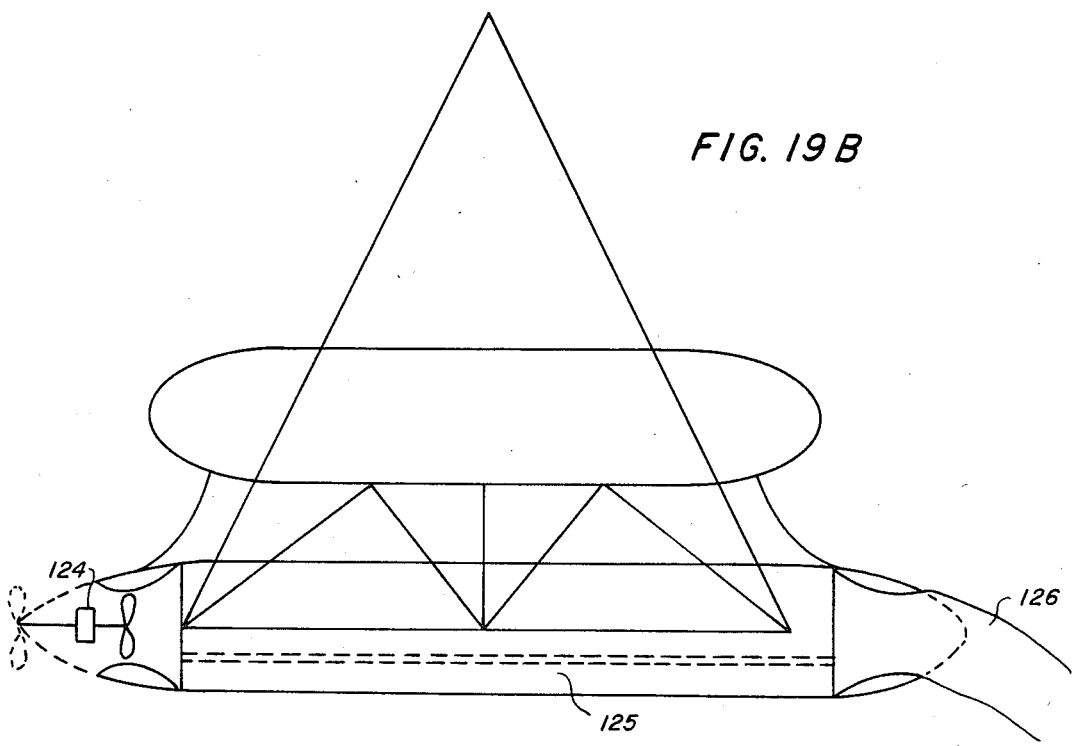

FIG. 19 illustrates an ocean thermal energy conversion (OTEC) SWATH/SAUCER type platform wherein the twin hulls are utilized for tube and shell cross flow heat exchangers for the boiler and condenser for the working fluid. The ellipsoidal hull of the design accommodates a large diameter horizontal turbine. A VAWT can be used to provide additional electrical power. A wave energy conversion device can be accommodated in the bottom of the saucer hull to provide additional power. The steadiness of the platform in the sea improves the efficiency of the wave energy coversion device. Solar cells can also be utilized on the large deck area of the platform to provide additional power, especially when energy is needed for repair to the OTEC system. Each of these systems are accommodated very efficiently utilizing the SWATH/SAUCER design. This design is called the "SWACER".

Figure 20A:
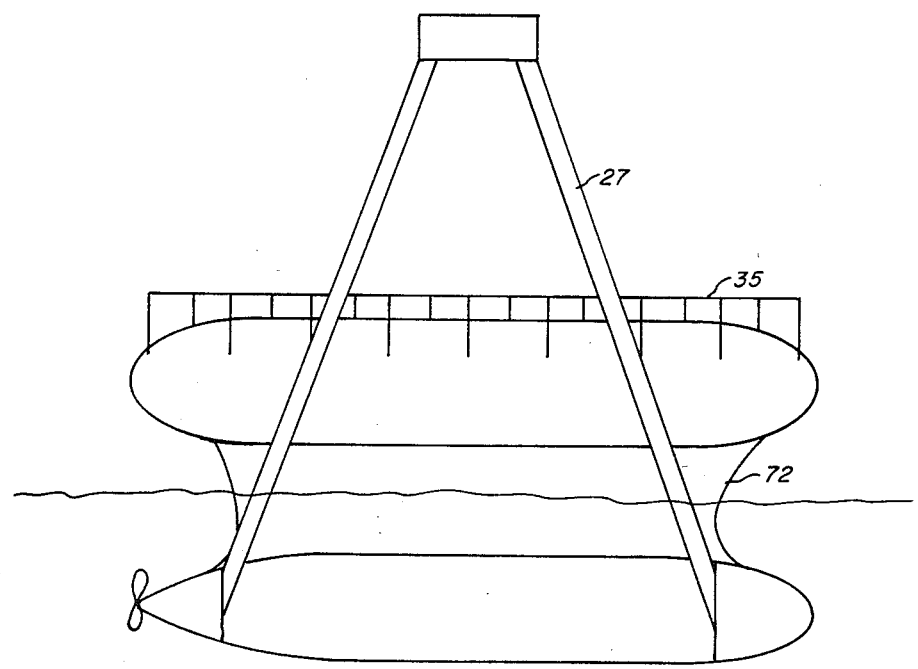
FIGS. 20A and 20B illustrate a search and rescue or sport fisherman end and side view design respectively useful in the invention.
Figure 20B:
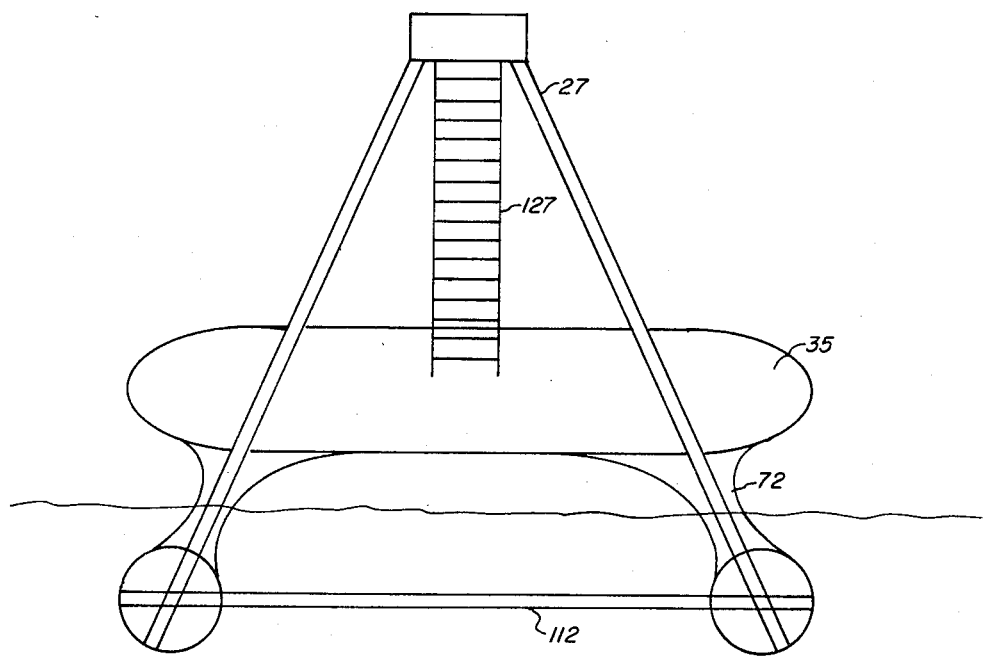

FIGS. 20A and 20B illustrate in a search and rescue or sport fisherman detail illustrating minor shifts of weight can cause changes of list and trim and changes in draft can help tune the SWATH to reduce motion in a given wavelength sea. A system is described whereby the draft of a SWATH can be controlled by blowing water out of tanks located at the ends of the two cylindrical hulls, or admitting water by venting air pressure much like submarine ballast tanks. Similarly operating two tanks at a time can control trim and list by having the communication to the sea located diametrically opposite, dynamic control of pitch and roll can be achieved. For example, as the bow pitches down, pipes on the bow opening to the sea are subjected to dynamic pressures and can also have minor shifts of weight causing changes of list and trim and changes in draft can help "tune" the SWATH to reduce motion in a given wavelength sea.

FIG. 21 illustrates how a "V" Darrieus windmill can utilize the blades for sailing when they are not being utilized as a windmill. The combination of a windmill and a sailboat yields a true "windboat" for the windmill generates power when the boat is at anchor, in port, or it is desired to go directly to windward. The same mast, and blades become the necessary appendages for sailing. In port or working at sea the blades become booms. The several modes of rigging sails are illustrated for sailing close to the wind, on a reach, or before the wind. This illustration is directly applicable to larger ships and other power driven vessels for wind-assisted propulsion. When wind, speed, and blade RPM increase, computer controls raise the collar or winch in the blades to reduce the intercepted wind area and thereby reduce the RPM and power output to prevent overspeed.

The straight blades, in FIG. 21, are not self starting. The folding savonins buckets start up the machine. After the blades start lifting and the windmill speeds up, centrifugal forces on weights act to collapse the savonins buckets around the base thereby reducing drag. The Darrieus blades are also self-regulating, for as the wind and RPM increase, centrifugal forces compress the spring and the blades open out catching less cross-sectional area of the wind.

Figure 22:
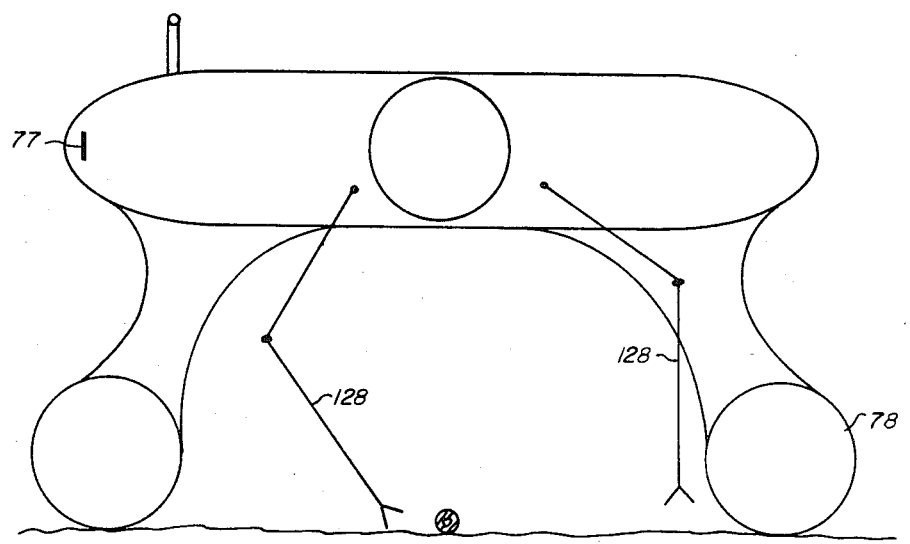
FIG. 22 illustrates a submersible based on the SWATH saucer concept capable of comfortable, independent surface operation and bottom work on cables, pipes, etc.

FIG. 22 illustrates a submersible based on the SWATH saucer design which is capable of comfortable, independent surface operation and bottoming. The mechanical arms can work on submerged cables and pipes and recover small objects for storage in the struts and larger objects by securing to the underbelly.

The advantages and new features of the invention are many. The combination of solar and wind sources utilized in the invention extend power generation. The tetrapod type mast dismounts easily through use of ball and socket/hinged slide-through connections. The large surface area of the multihull is good for solar cell application, as well as the broad base for the tetrapod mast. The tetrapod mast is appropriate where a well or superstructure interferes with the base of the standard mast. The sailing saucer operates easily with either manual or automatic sail. The strength of continuously curved surfaces improves seaworthiness and reduces materials required for the hull. The radar cross-section of the saucer is small and similar to that of the stealth aircraft. The mathematical symmetry of the cylindrical weapon magazines and bulkheads in the ellipsoid lends itself to automated forming and welding, as well as yielding greater strength. The saucer shape permits better construction, automatic fabrication and welding, and optimization of weapons, sensors, and communications around 360° of relative bearing. The curved surfaces are amendable to fabrication composites using carbon, glass, or kevlar fibers. The CBR water washdown systems are simple. In the aircraft/seacraft carrier design, a downed aircraft in the sea can be quickly recovered through the elevator. Other advantages and new features and many modifications and variations of the present invention are possible in light of the above teachings. It is therefore to be understood that within the scope of the appended claims, the invention may be practiced otherwise than as specifically described.

What is claimed is:

1. An apparatus for use on a land site and land vehicle for gathering and converting natural energy into electrical energy comprising:
   (a) a vertical axis wind turbine means suitably attached to a support means for providing energy to a energy storage system, said attached position of the vertical axis wind turbine means is interfaced with a curvilinear generator located at the bottom of the windmill blade which doubles as a railing for the land site apparatus location and land vehicle,
   (b) a solar cell means suitably attached to said vessel for providing energy to said energy system, and
   (c) an energy storage system suitably affixed and interfaced with said vertical axis wind turbine means and said solar cell means sufficient to accept energy therefrom and store for later use.

2. The apparatus of claim 1, wherein said vertical axis wind turbine means and said solar cell means are used together as a combined hybrid or separately for providing energy to said energy system.

3. The apparatus of claim 1, wherein the solar cell means is a portable roll up type or permanently mounted type.

4. The apparatus of claim 1, wherein the energy storage system is a battery or other energy storage device.

5. The apparatus of claim 1, wherein the vertical axis wind turbine means is one of the several Darrieus designs.

6. The apparatus of claim 5, wherein the vertical axis wind turbine means is an eggbeater type Darrieus design.

7. The apparatus of claim 5, wherein the vertical axis wind turbine means is a straight type Darrieus design.

8. The apparatus of claim 5, wherein the vertical axis wind turbine means is a "V" type Darrieus design.

9. The apparatus of claim 1, wherein the support means is a tetrapod mast.

10. The apparatus of claims 5, 7, or 8, wherein the vertical axis wind turbine means is collapsible.

11. The apparatus of claims 5, 6, 7, or 8, wherein the vertical axis wind turbine means is self-governing.

12. An apparatus for use on a vessel for gathering and converting natural energy into electrical energy comprising:
   (a) a vertical axis wind turbine means suitably attached to a support means for providing energy to an energy storage system, said attached position of the vertical axis wind turbine means is interfaced with a curvilinear generator located at the bottom of the windmill blade doubles as a railing for the vessel,
   (b) a solar cell means suitably attached to said vessel for providing energy to said energy system, and
   (c) an energy storage system suitably affixed and interfaced with said vertical axis wind turbine means and said solar cell means sufficient to accept energy therefrom and store for later use.

13. An apparatus for use on a vessel for gathering and converting natural energy into electrical energy as in claim 12, wherein the vertical axis wind turbine means is one of the several Darrieus type designs.

14. An apparatus for use on a vessel for gathering and converting natural energy into electrical energy as in claim 13, wherein the vertical axis wind turbine means is an eggbeater type Darrieus design.

15. An apparatus for use on a vessel for gathering and converting natural energy into electrical energy as in claim 13, wherein the vertical axis wind turbine means is a straight blade type Darrieus design.

16. An apparatus for use on a vessel for gathering and converting natural energy into electrical energy as in claim 13, wherein the vertical axis wind turbine means in a "V" type Darrieus design.

17. The apparatus of claim 13, wherein the "V" Darrieus blade is started up by collapsible type Savonius buckets that fold around the support circumference or base after start-up.

18. An apparatus for use on a vessel for gathering and converting natural energy into electrical energy as in claim 12, wherein the solar cell means is a portable roll up type or permanently mounted type.

19. An apparatus for use on a vessel for gathering and converting natural energy into electrical energy as in claim 12, wherein the energy storage system is a battery or other energy storage device.

20. An apparatus for use on a vessel for gathering and converting natural energy into electrical as in claim 12, wherein said vertical axis wind turbine means and said solar means are used together as a combined hybrid or separately for providing energy to said energy system.

21. An apparatus for use on a vessel for gathering and converting natural energy into electrical energy as in claims 13, 15, or 16 is collapsible.

22. The apparatus of claims 13, 14, 15, or 16, wherein the vertical axis wind turbine means is self-governing.

23. An apparatus for use on a vessel for gathering and converting natural energy into electrical as in claim 12, wherein the support means is a tetrapod mast.

24. An apparatus for use on a vessel for gathering and converting natural energy into electrical energy as in claim 12, wherein the vessel is a sail vessel.

25. An apparatus for use on a vessel for gathering and converting natural energy into electrical energy as in claim 24, wherein the sail vessel is equipped with a versatile or windbeater sail is a combination jib, mainsail, and spinnaker using the windmill blades as booms and poles.

26. An apparatus for use on a vesel for gathering and converting natural energy into electrical energy as in claim 25, wherein the sail is a versatile or windbeater sail that is easily trimmed through 360° by one continuous sheet driven by a clockwise/counterwise gears electrically or manually operated.

27. An apparatus for use on a vessel for gathering and converting natural energy into electrical energy as in claim 12, wherein the vessel is a saucer or ellipsoid shaped vehicle.

28. An apparatus for use on a vessel for gathering and converting natural energy into electrical energy as in claim 27, wherein the saucer shaped vehicle is in combination with a cylindrical or SWATH shaped vehicle.

29. An apparatus for use on a vessel for gathering and converting natural energy into electrical energy as in claim 28, wherein the structural framework of the vehicle is pyramidal.

30. An apparatus for use on a vessel for gathering and converting natural energy into electrical energy as in claim 28, wherein the SWATH/Saucer vehicle is adapted for use as an ocean thermal energy conversion platform for utilizing ocean thermal energy as well as wave energy, and solar energy.

31. An apparatus for use on a vessel for gathering and converting natural energy into electrical energy as in claim 29, wherein the SWATH/Saucer vehicle is adapted for use as a drilling platform.

32. The apparatus of claim 29, wherein th ellipsoidal hull contains vertical lanuch tubes of various lengths and diameters for various size upward and downward launch decoy, sensor, and other weapon devices for the vessel.

33. The apparatus of claim 27, wherein the vessel is a saucer, ellipsoid, and SWATH shaped vehicel utilized in conjunction with the versatile or windbeater sail.

34. An apparatus for use on a vessel for gathering and converting natural energy into electrical energy as in claim 27, wherein the ellipsoid shaped vehicle is adapted with pyramidal structural framework.

35. An apparatus for use on a vessel for gathering and converting natural energy into electrical energy as in claim 12, wherein the vessel is adapted with angled struts and the structural framework of the vessel is pyramidal where the connection between the underwater cylinders completing the pyramid's base is a hydrofoil and/or a pipe useful for sonar, electrical cables, or fluid carrying pipes.

36. The apparatus of claims 12 or 27, wherein the vessel is a SWATH saucer type vessel adapted for use in drilling, exploration, and deep ocean rescue operations.

37. The solar cell apparatus of claims 3 or 9 are positioned appropriately in a hinged mode.

* * * * *